Jan. 7, 1969   W. E. FRITZ   3,420,501
VALVE
Original Filed Aug. 26, 1963                Sheet 1 of 3
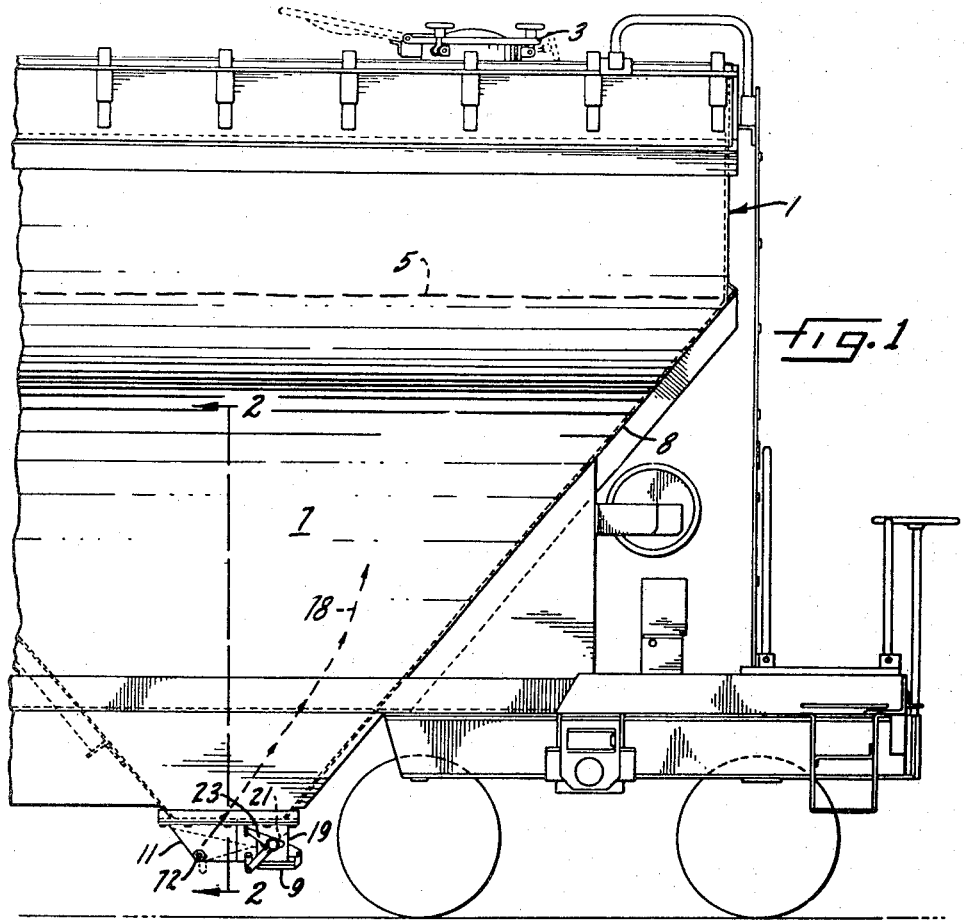
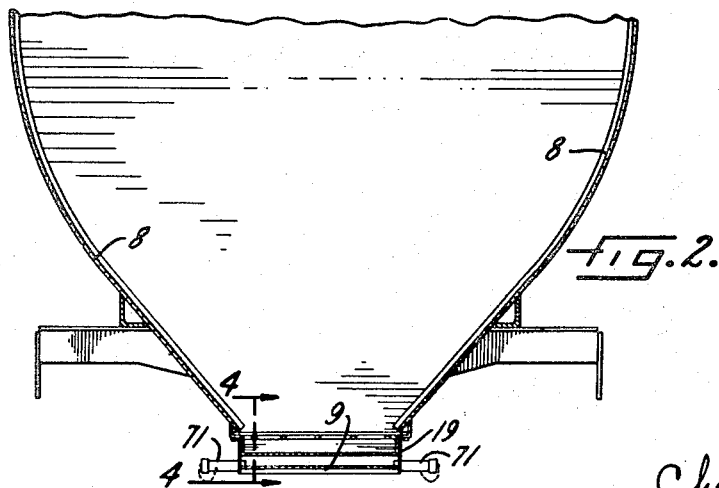
INVENTOR
WILLIAM E. FRITZ
BY Charles M. Kaplan
ATTORNEY

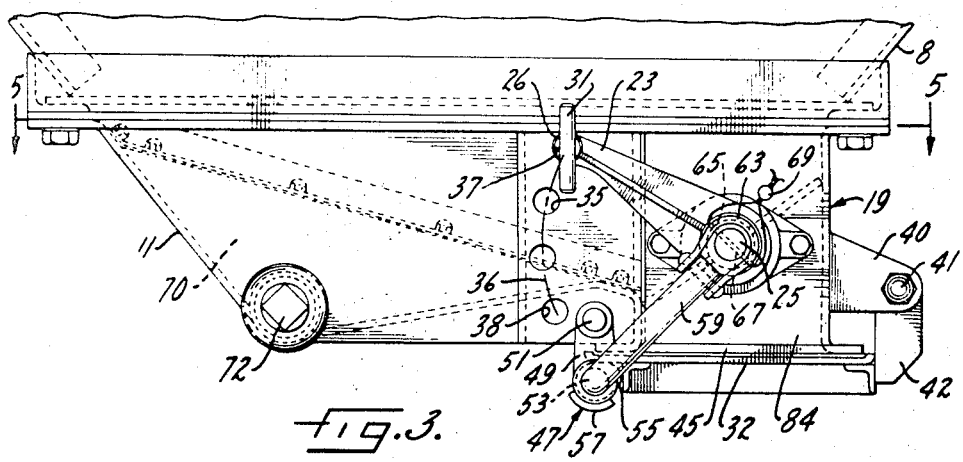
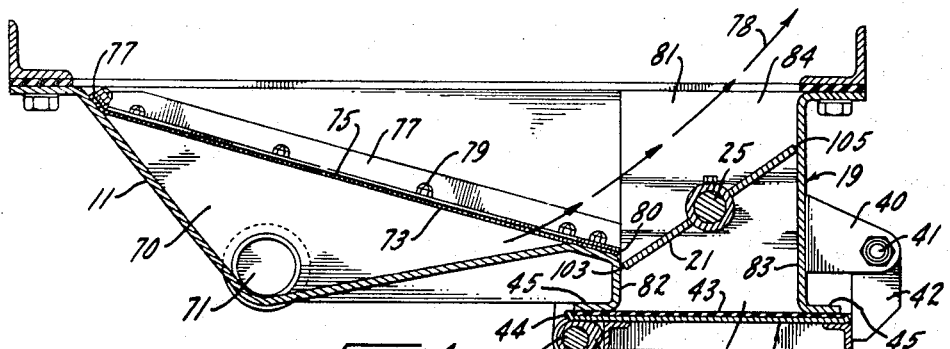
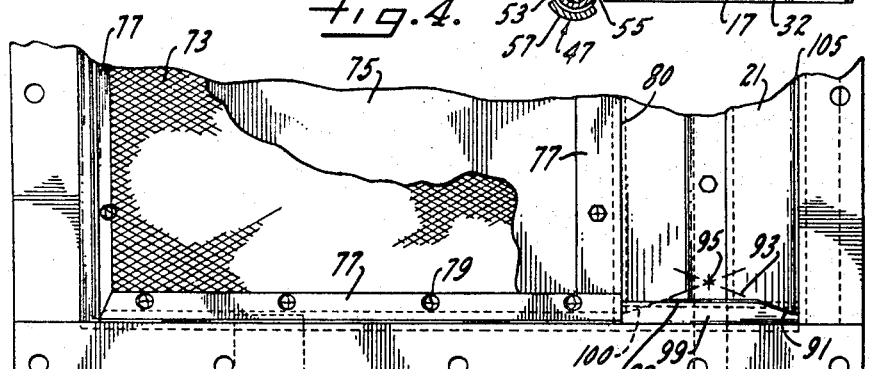
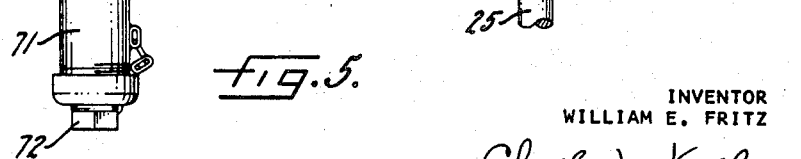

Jan. 7, 1969 W. E. FRITZ 3,420,501
VALVE
Original Filed Aug. 26, 1963 Sheet 3 of 3
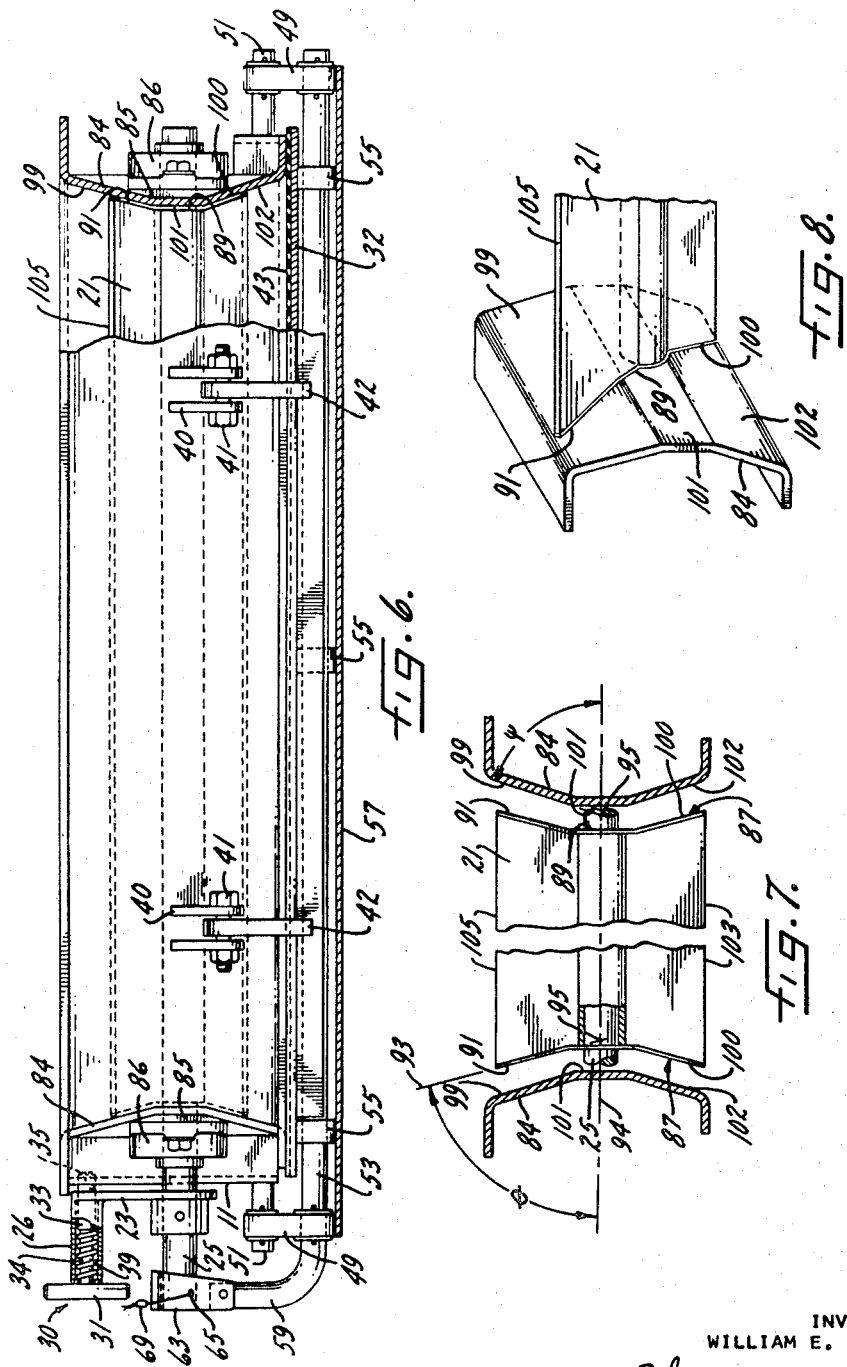
INVENTOR
WILLIAM E. FRITZ
BY Charles M. Kaplan
ATTORNEY United States Patent Office 3,420,501
Patented Jan. 7, 1969

1

3,420,501
VALVE
William E. Fritz, Hinsdale, Ill., assignor to Union Tank Car Company, a corporation of New Jersey
Original application Aug. 26, 1963, Ser. No. 304,445, now Patent No. 3,296,980, dated Jan. 10, 1967. Divided and this application Sept. 13, 1965, Ser. No. 486,961
U.S. Cl. 251—305            8 Claims
Int. Cl. F16k 1/22

ABSTRACT OF THE DISCLOSURE

A value closure member has a concave sealing surface that closes against a convex seat by binding engagement.

---

This is a division of my copending application Ser. No. 304,445, field Aug. 26, 1963, titled Railway Hopper Car Closure Latching and Sealing Means, now U.S. Patent 3,296,980, and assigned to the same assignee as this invention.

This invention relates to values, and more particularly to valves having a pivotable closure member movable into contact with a stationary seat.

In prior art gate valves, movement of the closure member can cause abrasion and removal of protective coatings on the valve chamber, which were designed to insulate the stored materials and the base material of construction of the valve chamber from contact with each other. Also, in arrangements where the closure member seals the valve chamber by contacting horizontal shelves, finely divided material passing through the open valve is often trapped on the shelves; the material can stagnate there and also prevent resealing contact between the closure member and the shelves. Sealing surfaces of the closure member disclosed hereafter are shaped to prevent abrasion of protective coatings on the valve chamber. Furthermore, sealing movement of the closure member plate is such that its only contact with the valve sealing surface is by binding engagement along predetermined lines.

Accordingly, it is an object of this invention to provide a valve having an improved sealing arrangement between a closure member and its seat.

Another object is to provide an improved pivotable gate valve.

Another object is to provide a tight sealing valve for containers for finely divided solids.

Another object is to provide a discharge valve arrangement for an internally coated container which will effectively seal, but will prevent abrasion of coated surfaces by the valve mechanism.

Another object is to prevent a valve for controlling the discharge of finely divided materials from having internal surfaces that can trap the material and allow it to stagnate in the valve.

Other objects and advantages of the invention will be apparent from the drawing, specification and claims, and the scope of the invention will be pointed out in the claims. Briefly stated, according to one aspect of this invention, the movable member of a valve has a face defining a concave surface that seals against a convex surface of a stationary valve seat.

2

In the drawings:

FIG. 1 is a side elevation of a railroad hoper car in accord with this invention.

FIG. 2 is a partially broken away end elevation taken along line 2—2 of FIG. 1.

FIG. 3 is an enlarged side elevation of the discharge arrangement at the bottom of the hopper shown in FIG. 1.

FIG. 4 is an enlarged cross sectional view taken along 4—4 in FIG. 2.

FIG. 5 is an enlarged broken away plan view taken along line 5—5 in FIG. 3.

FIG. 6 is a partially broken away end elevation view of FIG. 3.

FIG. 7 is an exploded, framgentary, cross sectional view of the closure plate and side wall of FIG. 6, with the closure plate in a vertical, fully open position.

FIG. 8 is a perspective view of the relative positions of the closure plate and side wall of FIG. 7 when the closure plate is in its closed position.

Referring to the drawings, a railroad hopper car 1 has a vent hatch 3 and contains a finely divided material 5 stored in a hopper 7 defined by sloping walls 8. The material 5 is unloaded through discharge port 9 in an outlet housing 11. A valve 19 having a substantially flat closure member or plate 21 controls the discharge flow of material 5.

The degree of opening of closure plate 21 is controlled by a lever 23 connected to horizontal shaft 25. The head of lever 23 contains a conduit 26. A locking peg 30 comprising a handle 31 and a shank 33, having a reduced portion 34, passes through conduit 26 and into one of a number of receptacles 35 whose distances apart on arc 36 correspond to various predetermined degrees of opening of valve 19. Receptacle 37 determines the closed position of valve 19, and receptacles 38 determine the various open positions of valve 19. A compression spring 39 receives portion 34 and urges peg 30 into any chosen receptacle.

A cover plate 32 having a lip 44 protects port 17 from atmospheric contamination. Cover 32 is pivotally mounted on lug 40 at hinge 41 through arm 42. As shown in FIG. 4, a gasket 43 may be placed between cover 32 and a flange 45 on valve 19 to seal port 17. At lock 47 holds cover 32 in a closed position. Lock 47 includes arms 49 swingably mounted on fixed horizontal shafts 51, which are mounted on housing 11. Arms 49 support a rotatable horizontal shaft 53 having cams 55 mounted thereon. Shaft 53 is parallel to and below the edge of lip 44 so that when cover 32 is in its closed position lip 44 will rest on cams 55. A horizontal stop 57 having an arcuate cross section is attached to the base of arms 49 adjacent and parallel to shaft 53 so that cams 55 will contact stop 57 after partial rotation of shaft 53.

A bend in shaft 53 defines an operating handle 59, having a "U" shaped clevis 63 pivotally mounted on its head. Clevis 63 is dimensioned to receive the outer end of shaft 25 which extends beyond housing 11. Aligned apertures 65 in clevis 63 are concentric with a hole 67 through the end of shaft 25, so that a car seal 69 can simultaneously pass through apertures 65 and hole 67. This permits a single car seal to fixedly interconnect handle 59 and shaft 25 so that the seal 69 must be broken before either valve 19 or cover 32 can be opened. Alternatively, clevis 63 could be placed on shaft 25 and dimensioned to receive handle 59, with the remaining features and operation of the sealing arrangement being as described above.

Referring to FIGS. 4 and 5, a gas plenum chamber 70 is mounted in housing 11. A gas inlet line 71 having a removable cap 72 supplies chamber 70 with pressurized gas from any conventional source (not shown). Mounted above the chamber 70 is a screen 73 supporting a gas permeable membrane 75, such as burlap or woven polypropylene. Hold down strips 77 secure membrane 75 and screen 73 to the walls of chamber 70 with bolts 79. Membrane 75 slopes downwardly toward port 17 and has its lower end 80 adjacent a substantially rectangular valve seat chamber 81. End 80 is situated at the top of short vertical end wall 82 of chamber 81, and end 80 is parallel to and lower in elevation than shaft 25 which defines the pivot axis of valve 19. Application of pressurized gas through inlet 71 to chamber 70 will cause an aerating stream 78 to flow upwardly toward vent hatch 3 and thus through material on top of plate 21.

Chamber 81 also has a high vertical end walll 83 and side walls 84. Shaft 25 is parallel to walls 82 and 83, and passes through openings in each wall 84; the openings in walls 84 are sealed by rubber gaskets 85 compressed against the outside of walls 84 by bearings 86.

Plate 21 is fixedly mounted on shaft 25 to rotate therewith for opening and closing valve 19. Plate 21 has terminal side faces 87, each of which has a central flat portion 89 in a vertical plane when in the position shown in FIG. 7. Biased flat portions 91 project toward side walls 84 from portion 89. Each portion 91 has a longitudinal center line 93 which intersects the longitudinal center line 94 of shaft 25 at a first acute angle $\theta$, at a point 95; each wall 84 has a flat sealing surface 99 sloping downwardly toward plate 21. For proper sealing of plate 21 against walls 84, the plane of surface 99 should intersect center line 94 at point 95 at a second angle $\psi$ which is smaller than angle $\theta$. This permits portion 91 to seal against surface 99 by straight line contact because portion 91 will be wholly in the plane of surface 99. This can be explained by the geometry of intersecting surfaces, which reveals that the rotation of shaft 25 causes portions 91 to generate an imaginary conical surface of revolution having the shape of a frustrum of a cone whose vortex is coincident with point 95. During such rotation, each portion 91 lies entirely in the line of intersection of the imaginary conical surface with different planes which pass through point 95, because point 95 corresponds to the vertex of the imaginary conical surface and a plane passing through the vertex of a cone will intersect the cone in a straight line. Thus on rotation of shaft 25 in a counterclockwise direction as viewed in FIG. 8, portion 91 will approach surface 99 and finally bind thereagainst in a sealing manner by lying entirely in the plane of surface 99.

A vertical portion 101 depends from the lower part of surface 99 and is in sliding sealing contact with portion 89 of plate 21. The vertical length of surface 101 is less than the true length of portion 89 in order to prevent surface 99 from binding against surface 101 during rotation.

Wall 84 also has a surface 102 which slants upwardly toward plate 21 to a connection with the bottom of surface 101. Plate 21 has a lower biased side portion 100 which cooperates with surface 102 in a manner identical to that in which portion 91 cooperates with surface 99, except that portion 91 must rotate downwardly to contact surface 99, while portion 100 must rotate upwardly to contact surface 102.

Plate 21 has a lower terminal end face 103 which is located directly below shaft 25 when plate 21 is in widest open or vertical position and an upper terminal end face 105 which is located directly above shaft 25 when plate 21 is in such vertical position. When plate 21 is in its closed position, face 103 is in sealing contact with wall 82, and face 105 is in sealing contact with wall 83.

The dimensions of portions 91, 100, and faces 103 and 105 are such that they will contact their respective valve seats on walls 82, 83 and 84 simultaneously. All sealing surfaces of plate 21 are cushioned by a rubber coating so as to be at least as soft as the internal surfaces of chamber 81, which may be coated with an epoxy paint to prevent the stored commodity from contacting the metal from which the apparatus is made.

Operation of the invention

Referring to FIGS. 1, 3 and 5, car 1 is inspected by a workman prior to discharging finely divided material 5. Observation of an unbroken car seal 69 connecting handle 59 and shaft 25 indicates that during transit neither valve 19 nor cover plate 32 have been opened because car seal 69 prevents rotation of handle 59 and shaft 25.

Car seal 69 is then broken. Clevis 63 is removed from the end of shaft 25 and arm 59 is rotated in a clockwise direction, as viewed in FIG. 3, rotating horizontal shaft 53 and cams 55 until cams 55 contact stop 57. Further rotation of arm 59 swings arm 49 in a clockwise direction around shaft 51 until cams 55 no longer contact lip 44 of cover 32. Cover 32 will then rotate downwardly around hinge 41 to open port 17. A flexible hose (not shown) is attached in a conventional manner to flange 45, for conducting the material 5 from the car.

Hatch 3 is then opened, and pressurized gas is introduced into chamber 70 through line 71. Stream 78 then flows through membrane 75 upwardly toward hatch 3 and crosses plate 21 through material 5, the weight of which tends to rotate plate 21 into more tightly sealing contact with chamber 81. This fluidizes material 5 above plate 21 and will permit rotation of plate 21 in a counterclockwise direction against the weight of material 5. Handle 31 of peg 30 is pulled outwardly to compress spring 39 and remove shank 33 from receptacle 37. Operating handle 23 is then rotated in a counterclockwise direction to open valve 19. Plate 21 is held in a fixed open position by allowing peg 30 to enter any desired receptacle 38.

Walls 8 of hopper 7 have an angle with the horizontal which is greater than the angle of repose of material 5 when aerated. Therefore, flow of material 5 will commence through valve 19 as soon as plate 21 is opened, and the flow will continue until hopper 7 is empty.

Emanation of stream 78 from chamber 70 is continued in order to displace quantities of material 5 falling on membrane 75 from upper regions of hopper 7. Most of stream 78 will then accompany material 5 through port 17, because this is the path of least resistance. When hopper 7 is empty, the gas is shut off, and the flexible hose is removed from flange 45. Plate 21 is then turned toward its closed position by rotating handle 23 so that peg 31 approaches receptacle 37. Rotation of plate 21 to its closed position causes face 105 to contact wall 83 of seat chamber 81, and face 103 to contact wall 82. Simultaneously, portion 91 approaches surface 99 by rotating around center line 94 of shaft 25. Since portion 89 has a true length greater than the vertical length of portion 101, no part of portion 91 will contact portion 99 until the entire area of portion 91 seals against surface 99 by lying completely on the plane of surface 99. This single line of contact sealing action between portion 91 and wall 84 precludes the possibility of abrasion of the coating on wall 84 due to scraping by portion 91.

Since none of the sealing surfaces in chamber 81 are horizontal, finely divided material 5 will not be trapped while passing through valve 19; this prevents stagnation and interference with sealing engagement between plate 21 and chamber 81.

In a commercial embodiment of this invention, a railroad hopper car had 3 hoppers, each about 12'–6" high, each capable of containing about 1200 cubic feet of flour, and a fluidizing discharge arrangement in the bottom of each hopper as previously described having the following approximate specifications.

Plate 19:
- Material _____ Steel, coated with 3/16" thick type "W" neoprene rubber of 30 durometer hardness.
- End edge 105, length _____ 2'–6½".
- Central flat side portion 89, length _____ 3⅛".
- Biased side portion 91, length _____ 1²⁹⁄₃₂".
- Angle θ _____ 78°45'.

Valve seat chamber 81:
- Vertical planar portion 101, length _____ 1¹¹⁄₁₆".
- Angle ψ _____ 76°35'.

In operation of a commercial embodiment of this invention, having the aforementioned specifications, it was impossible to manually rotate plate 19 against the load of flour bearing thereon. However, after applying a fluidizing air stream at an average flow rate of about 200 c.f.m. for about five minutes, plate 19 was easily rotated manually to its open position.

It will be understood that while the forms of the invention herein shown and described constitute preferred embodiments, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What is claimed is:

1. A valve comprising:
    (A) a movable member having a terminal end face defining a sealing surface, said sealing surface being flat in the dimension of the thickness of said movable member,
    (B) means defining a stationary seat against which said terminal end face seals,
    (C) said sealing surface being concave in the dimension of the width of said movable member, and
    (D) said stationary seat defining a convex sealing surface that is flat in its longitudinal dimension and convex in its transverse dimension.

2. A valve comprising:
    (A) a movable member having a terminal side face and a terminal end face,
    (B) means defining a valve seat having a first portion for sealing said side face and a second portion for sealing said end face,
    (C) said side face defining a concave sealing surface and said first portion defining a convex sealing surface, and
    (D) said concave and convex surfaces having a common line of contact when said member is in closed position.

3. A valve comprising:
    (A) a member pivotable around an axis,
        (1) said member having a sealing face that defines an imaginary truncated conical surface as said member pivots,
        (2) said conical surface defining a predetermined first acute angle with respect to said axis,
        (3) said conical surface having an imaginary vertex on said axis, and
    (B) a stationary planar surface against which said face seals,
        (1) said planar surface defining a second acute angle with respect to said axis,
        (2) said second angle being smaller than said first angle, and
        (3) said planar surface passing through said vertex whereby the only contact between said face and said planar surface is straight line contact.

4. A valve comprising:
    (A) a movable member pivotable about an axis and having
        (1) an end face, and
        (2) a side face defined by
            (a) a substantially vertical portion, and
            (b) an inclined portion defining a predetermined first acute angle with respect to said axis,
    (B) means defining a valve seat having
        (1) a substantially vertical end wall for sealing with said end face,
        (2) a side wall for sealing with said side face defined by
            (a) a substantially vertical portion, and
            (b) an inclined portion defining with respect to said axis a second predetermined acute angle that is smaller than said first angle.

5. A valve comprising:
    (A) a movable member pivotable about a substantially horizontal axis passing through its center and having
        (1) terminal end faces,
        (2) terminal side faces each defined by
            (a) a substantially vertical portion, and
            (b) inclined portions each defining a predetermined first acute angle with respect to said axis,
    (B) means defining a valve seat having
        (1) substantially vertical end walls for sealing with said end faces,
        (2) side walls for sealing with said side faces, each side wall being defined by
            (a) a substantially vertical portion,
            (b) inclined portions each defining a second predetermined acute angle with respect to said axis that is smaller than said first angle,
            (c) each of said vertical portions being perpendicular to said axis, and
    (C) means coinciding with said axis passing through said vertical portions for pivotably supporting said member.

6. A valve comprising:
    (A) a movable flat plate pivotable about a substantially horizontal axis passing longitudinally through its center and having
        (1) straight terminal end faces,
        (2) terminal side faces each defined by
            (a) a substantially vertical straight portion, and
            (b) inclined straight portions each defining a predetermined first acute angle with respect to said axis,
    (B) means defining a generally rectangular valve seat having
        (1) substantially vertical straight end walls parallel to said axis for sealing with said end faces,
        (2) side walls for sealing with said side faces, each side wall being defined by
            (a) a substantially vertical flat planar portion,
            (b) flat planar inclined portions each defining a second predetermined acute angle with respect to said axis that is smaller than said first angle, and
            (c) said vertical planar portion being perpendicular to said axis.

7. A valve comprising:
    (A) a member rotatable about an axis, said member having flat end faces whose longitudinal center lines intersect on a point on said axis;

(B) a valve seat comprising flat surfaces whose planes intersect at a line including said point on said axis at an angle contained within the angle at which said flat end faces intersect;

whereby on rotation of said member said flat end faces can lie in the plane of said flat surfaces.

8. A valve comprising:
(A) a member rotatable about an axis, said member having flat end faces whose longitudinal center lines intersect a point on said axis at an angle which is bisected by said axis;
(B) a valve seat comprising flat surfaces whose planes intersect at a line including said point on said axis at an angle bisected by said axis and contained within the angle at which said flat end faces intersect;

whereby on rotation of said member said flat end faces can lie in the plane of said flat surfaces.

References Cited

UNITED STATES PATENTS

| 980,011 | 12/1910 | Schafer | 126—292 |
| 1,443,000 | 1/1923 | Briggs | 251—308 |
| 2,363,279 | 11/1944 | Anschicks. | |
| 2,662,545 | 12/1953 | Kelley | 251—305 X |
| 2,867,238 | 1/1959 | Wilfert | 251—305 X |
| 2,896,904 | 7/1959 | Northup | 251—147 |
| 3,123,334 | 3/1964 | Hitz | 251—147 |

FOREIGN PATENTS 345,774   5/1960   Switzerland.

M. CAREY NELSON, *Primary Examiner.*

R. C. MILLER, *Assistant Examiner.*